(12) United States Patent
Dindi (10) Patent No.: US 9,499,405 B2
(45) Date of Patent: Nov. 22, 2016

(54) PROCESS FOR PRODUCING SULFURIC ACID WITH LOW LEVELS OF NITER

(71) Applicant: E I DU PONT DE NEMOURS AND COMPANY, Wilmington, DE (US)

(72) Inventor: Hasan Dindi, Wilmington, DE (US)

(73) Assignee: EI DU PONT DE NEMOURS AND COMPANY, Wilmington, DE (US)

( * ) Notice: Subject to any disclaimer, the term of this patent is extended or adjusted under 35 U.S.C. 154(b) by 2 days.

(21) Appl. No.: 14/642,840

(22) Filed: Mar. 10, 2015

(65) Prior Publication Data

US 2016/0264420 A1 Sep. 15, 2016

(51) Int. Cl.
*C01B 17/90* (2006.01)
*C01B 17/94* (2006.01)

(52) U.S. Cl.
CPC .................... *C01B 17/90* (2013.01)

(58) Field of Classification Search
CPC ............... C01B 17/90; C01B 17/94
See application file for complete search history.

(56) References Cited

U.S. PATENT DOCUMENTS

| 3,012,854 A | 12/1961 | Plesmid | |
| 5,955,050 A * | 9/1999 | Drexler | C01B 17/94 423/522 |
| 2014/0056802 A1 | 2/2014 | Dindi et al. | |

FOREIGN PATENT DOCUMENTS

| CA | 2134270 C * | 7/2005 | ............. C01B 17/94 |
| EP | 0369973 A1 * | 5/1990 | ............. C01B 17/90 |
| JP | 6-219711 A | 8/1994 | |
| RU | 2349544 C1 | 3/2009 | |

OTHER PUBLICATIONS

Aniol et al., Usuwanie Tlenkowazotu Z Kwasu Siarkowego Otrzymywanego Metoda Kontaktowa, Przemysl Chemiczny, vol. 73, No. 11, 1994, 437-438 (No Translation).
Federal Specification O-S-801F, Notice 2, Jul. 27, 2011.
International Search Report/Written Opinion, PCT/US2013/056706, Mailed Dec. 5, 2013.

* cited by examiner

*Primary Examiner* — Timothy Vanoy (57) ABSTRACT

This disclosure relates to a process for producing sulfuric acid with reduced levels of niter. The process involves (a) providing an absorption tower wherein sulfur trioxide is absorbed in a sulfuric acid feed having a first sulfuric acid solution to produce a sulfuric acid effluent having (i) a second sulfuric acid solution which has a higher concentration than the first sulfuric acid solution, (ii) a niter concentration greater than about 5 ppm (as $NO_3$), and (iii) a temperature greater than 100° C.; and (b) contacting a first purifying agent comprising sulfamic acid and a second purifying agent comprising hydrogen peroxide with the sulfuric acid effluent to form a treated sulfuric acid effluent, the treated sulfuric acid effluent being maintained at a temperature of greater than 100° C. for a maintenance period of at least about 1 minute.

26 Claims, 2 Drawing Sheets

PROCESS FOR PRODUCING SULFURIC ACID WITH LOW LEVELS OF NITER

BACKGROUND

1. Field of the Disclosure

The present disclosure relates to sulfuric acid production with integral treatment of niter impurities, and sulfuric acid thus obtained having low levels of niter impurities.

2. Description of Related Art

Sulfuric acid, in particular concentrated sulfuric acid, typically contains small amounts of various nitrogen oxides and other nitrogen-containing impurities, collectively referred to as niter. Nitrosylsulfuric acid ($NOHSO_4$) is believed to be the predominant niter species, but other niter species may also be present. In some applications, the presence of even small amounts of nitrosylsulfuric acid or other niter species can be problematic. For example, a specification of less than 5 parts per million by weight (ppm) $NO_x$ for electrolyte grade sulfuric acid has been set by the United States General Services Administration (Federal Specification O-S-801F, Notice 2, 27 Jul. 2011). Sulfuric acid from a typical production line including those that use spent sulfuric acid as a feed material must be post-treated to reduce the niter content below 5 ppm level.

BRIEF SUMMARY OF THE DISCLOSURE

The present disclosure provides a process for producing sulfuric acid with reduced levels of niter. The process comprises: (a) providing an absorption tower wherein sulfur trioxide is absorbed in a sulfuric acid feed having a first sulfuric acid solution to produce a sulfuric acid effluent having (i) a second sulfuric acid solution which has a higher concentration than the first sulfuric acid solution, (ii) a niter concentration greater than about 5 ppm (as $NO_3$), and (iii) a temperature greater than 100° C.; and (b) contacting a first purifying agent comprising sulfamic acid ($H_3NSO_3$) and a second purifying agent comprising hydrogen peroxide ($H_2O_2$) with the sulfuric acid effluent to form a treated sulfuric acid effluent, the treated sulfuric acid effluent being maintained at a temperature of greater than 100° C. for a maintenance period of at least about 1 minute.

The present disclosure also provides a sulfuric acid solution produced by the process of this disclosure. Such sulfuric acid solution has sulfuric acid concentration in the range of about 90 wt % to about 99.5 wt % and has niter concentration (as $NO_3$) no more than about 5 ppm.

BRIEF DESCRIPTION OF THE FIGURES

Embodiments are illustrated in the accompanying figures to improve understanding of concepts as presented herein.

Skilled artisans appreciate that objects in the figures are illustrated for simplicity and clarity and have not necessarily been drawn to scale. For example, the dimensions of some of the objects in the figures may be exaggerated relative to other objects to help to improve understanding of embodiments.

DETAILED DESCRIPTION

The foregoing general description and the following detailed description are exemplary and explanatory only and are not restrictive of the invention, as defined in the appended claims. Other features and benefits of any one or more of the embodiments will be apparent from the following detailed description, and from the claims.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. In case of conflict, the present specification, including definitions, will control. Although methods and materials similar or equivalent to those described herein can be used in the practice or testing of embodiments of the present invention, suitable methods and materials are described below. In addition, the materials, methods, and examples are illustrative only and not intended to be limiting.

When an amount, concentration, or other value or parameter is given as either a range, preferred range or a list of upper preferable values and/or lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range.

Before addressing details of embodiments described below, some terms are defined or clarified.

The term, "ppm", as used herein, means parts per million by weight.

The term, "niter", as used herein, means various nitrogen compounds impurities present in the sulfuric acid product. Examples of niter include nitrogen oxides (NOx), nitrosylsulfuric acid ($NOHSO_4$), nitrososulfuric acid ($NO_2HSO_4$), nitrates, nitrites, etc. Examples of nitrates include $KNO_3$, $NaNO_3$, $NH_4NO_3$, etc. Examples of nitrites include $KNO_2$, $NaNO_2$, $NH_4NO_2$, etc. Examples of nitrogen oxides include $NO_2$, $NO$, $N_2O$, $N_2O_3$, etc. The niter concentration in sulfuric acid is measured by the colorimetric test using ferrous sulfate solution as described in the "Analytical Methods and Terms" section of this disclosure and is expressed as nitrate-equivalent concentration (ppm of $NO_3$).

For example, "a sulfuric acid solution having a niter concentration of 5 ppm" means a sulfuric acid solution, when measured by the colorimetric test of this disclosure, having the same degree of absorbance at 525 nm wavelength as the same sulfuric acid solution except wherein the niter content is replaced by 5 ppm $NO_3$ (nitrate).

The term, "stoichiometric amount", as used herein, means the equal molar amount of niter present in the sulfuric acid solution as measured by the colorimetric test of this disclosure and expressed as nitrate ($NO_3$) equivalent. For example, if a 200 g sulfuric acid effluent has a niter concentration of 20 ppm (as $NO_3$), the stoichiometric amount of sulfamic acid for the treatment can be calculated according to the following equation:

$$SASA\ (g)=97.1\ g/mol \times 200\ g \times 0.00002 \div 62\ g/mol = 0.0062645\ g$$

SASA=stoichiometric amount of sulfamic acid
97.1 g/mol=molecular weight of sulfamic acid
62 g/mol=molecular weight of $NO_3$
0.00002=20 ppm Similarly, the stoichiometric amount of hydrogen peroxide for the treatment can be calculated according to the following equation:

$$SAHP\ (g)=34\ g/mol \times 200\ g \times 0.00002 \div 62\ g/mol = 0.0021935\ g$$

SAHP=stoichiometric amount of hydrogen peroxide
34=molecular weight of hydrogen peroxide Treatments to remove niter in the industry are done as a separate post-treatment of the sulfuric acid. It would be advantageous to have a process for niter removal which is integral with the sulfuric acid production.

The present disclosure provides a process for producing sulfuric acid with reduced levels of niter. The process comprises: (a) providing an absorption tower wherein sulfur trioxide is absorbed in a sulfuric acid feed having a first sulfuric acid solution to produce a sulfuric acid effluent having (i) a second sulfuric acid solution which has a higher concentration than the first sulfuric acid solution, (ii) a niter concentration greater than about 5 ppm (as $NO_3$), and (iii) a temperature greater than 100° C.; and (b) contacting a first purifying agent comprising sulfamic acid and a second purifying agent comprising hydrogen peroxide with the sulfuric acid effluent to form a treated sulfuric acid effluent, the treated sulfuric acid effluent being maintained at a temperature of greater than 100° C. for a maintenance period of at least about 1 minute. In some embodiments, the first purifying agent and the second purifying agent are contacted with the sulfuric acid effluent with a temperature greater than 100° C. In some embodiments, the first purifying agent and the second purifying agent are contacted with the sulfuric acid effluent with a temperature of from greater than 100° C. to about 150° C., from about 105° C. to about 150° C., from about 105° C. to about 140° C., from about 105° C. to about 130° C., from greater than 110° C. to about 150° C., from greater than 110° C. to about 140° C., from greater than 110° C. to about 130° C., or from about 110° C. to about 130° C.

In some embodiments, the above process further comprises a step of diluting the sulfuric acid effluent with water wherein the dilution is performed before, after, or at about the same time as the contacting step (b). In some embodiments, the dilution is performed prior to the contacting step (b). In some embodiments, the treated sulfuric acid effluent is diluted with water, the diluted treated sulfuric acid effluent is cooled, and at least a portion of the cooled diluted treated sulfuric acid effluent is recycled as all or part of the sulfuric acid feed to the absorption tower. In some embodiments, the diluted treated sulfuric acid effluent is cooled to a temperature no more than about 95° C. In some embodiments, the portion of the treated sulfuric acid effluent taken as recycle is diluted with water to the concentration equal to the concentration of the sulfuric acid feed.

It has been found that the reaction rate of sulfamic acid and hydrogen peroxide with niter impurities in sulfuric acid becomes fast enough at temperatures of greater than 100° C. that sulfuric acid can be treated during normal production with only minor changes to the production system.

According to the process of this disclosure, there is provided an absorption tower wherein sulfur trioxide is absorbed in a sulfuric acid feed having a first sulfuric acid solution and sulfuric acid effluent exits the absorption tower having a second sulfuric acid solution which has a higher concentration than the first sulfuric acid solution. The absorption tower can be any suitable tower or device, such as those known in the art for sulfuric acid production. In some embodiments, the absorption tower is an interpass tower. In some embodiments, the absorption tower is a countercurrent absorption tower. In some embodiments, the absorption tower is a co-current absorption tower. In some embodiments, the absorption tower comprises, consists essentially of, or consists of a single absorption zone. In some embodiments, the absorption tower comprises, consists essentially of, or consists of two or more absorption zones.

The absorption of $SO_3$ in the sulfuric acid feed is exothermic and the temperature of the sulfuric acid effluent exiting the absorption tower is typically greater than 100° C., for example, greater than about 105° C., greater than about 110° C., and even greater than about 120° C.

The sulfuric acid feed comprises, consists essentially of, or consists of a first sulfuric acid solution. The concentration of the first sulfuric acid solution (sulfuric acid feed) can be any convenient concentration, but typically is at least about 93 wt %. In some embodiments, the concentration of the first sulfuric acid solution is in a range of about 93 wt % to about 99.5 wt %. In some embodiments, the concentration of the first sulfuric acid solution is in a range of about 98 wt % to about 99.2 wt %. In some embodiments, the concentration of the first sulfuric acid solution is about 98 wt %.

The sulfuric acid effluent comprises, consists essentially of, or consists of (i) a second sulfuric acid solution, and (ii) niter impurities contained therein. The concentration of the second sulfuric acid solution (sulfuric acid effluent) can be any convenient concentration greater than the first sulfuric acid concentration, but is typically at least about 98 wt % or at least about 99 wt %. In some embodiments, the concentration of the second sulfuric acid solution is in a range of about 98.5 wt % to about 99.5 wt %.

In a typical state of the art process, the sulfuric acid effluent comprises niter impurities having concentration greater than about 5 ppm (as $NO_3$). In some embodiments, the sulfuric acid effluent comprises a niter concentration of at least about 6 ppm (as $NO_3$). In some embodiments, the sulfuric acid effluent comprises a niter concentration of at least about 10 ppm (as $NO_3$). In some embodiments, the niter concentration can be at least about 15 ppm (as $NO_3$), at least about 20 ppm (as $NO_3$), at least about 25 ppm (as $NO_3$), at least about 30 ppm (as $NO_3$), or can be up to 50 ppm (as $NO_3$) or more.

In some embodiments, the sulfuric acid effluent comprises a niter concentration of from about 10 to about 50 ppm (as $NO_3$). In some embodiments, the sulfuric acid effluent comprises a niter concentration of from about 10 to about 20 ppm (as $NO_3$). In some embodiments, the sulfuric acid effluent comprises a niter concentration of from about 10 to about 15 ppm (as $NO_3$).

The first purifying agent comprises, consists essentially of, or consists of sulfamic acid. In some embodiments, the first purifying agent comprises, consists essentially of, or consists of a sulfamic acid solution. In some embodiments, the sulfamic acid solution is an aqueous solution. Typically, the aqueous sulfamic acid solution can range from a 0.05 wt % solution to a saturated solution. At 0° C., the sulfamic acid solubility is about 14.7 g per 100 g of water. At 20° C., the sulfamic acid solubility is about 21.3 g per 100 g of water. At 40° C., the sulfamic acid solubility is about 29.5 g per 100 g of water. At 50° C., the sulfamic acid solubility is about 32.8 g per 100 g of water.

In some embodiments, the aqueous sulfamic acid solution can range from a 1 wt % solution to a saturated solution. In some embodiments, the aqueous sulfamic acid solution can range from a 5 wt % solution to a saturated solution. In some embodiments, the aqueous sulfamic acid solution can range from a 10 wt % solution to a saturated solution. In some embodiments, the aqueous sulfamic acid solution can range from a 15 wt % solution to a saturated solution.

The second purifying agent comprises, consists essentially of, or consists of hydrogen peroxide. In some embodiments, the second purifying agent comprises, consists essentially of, or consists of a hydrogen peroxide solution. In some embodiments, the hydrogen peroxide solution is an aqueous solution. Typically, the aqueous hydrogen peroxide solution has a concentration of from about 0.05 wt % to about 70 wt %. In some embodiments, the concentration is from about 1 wt % to about 70 wt %. In some embodiments, the concentration is from about 10 wt % to about 70 wt %. In some embodiments, the concentration is from about 20 wt % to about 70 wt %. In some embodiments, the concentration is from about 25 wt % to about 40 wt %. In some embodiments, the concentration is from about 30 wt % to about 35 wt %.

In some embodiments, both the first purifying agent and the second purifying agent are in the forms of aqueous solutions.

Typically, the amount of sulfamic acid used in contacting step (b) is at least the stoichiometric amount. In some embodiments, the amount of sulfamic acid used in contacting step (b) is from the stoichiometric amount to about 10 times stoichiometric amount. In some embodiments, the amount of sulfamic acid used in contacting step (b) is from the stoichiometric amount to about 5 times stoichiometric amount. In some embodiments, the amount of sulfamic acid used in contacting step (b) is from the stoichiometric amount to about 4 times stoichiometric amount. In some embodiments, the amount of sulfamic acid used in contacting step (b) is from twice the stoichiometric amount to about 3 times stoichiometric amount.

Typically, the amount of hydrogen peroxide used in contacting step (b) is at least the stoichiometric amount. In some embodiments, the amount of hydrogen peroxide used in contacting step (b) is from the stoichiometric amount to about 10 times stoichiometric amount. In some embodiments, the amount of hydrogen peroxide used in contacting step (b) is from the stoichiometric amount to about 5 times stoichiometric amount. In some embodiments, the amount of hydrogen peroxide used in contacting step (b) is from twice the stoichiometric amount to about 3 times stoichiometric amount.

The molar ratio of sulfamic acid to hydrogen peroxide used in contacting step (b) can be from 10:1 to 1:10. In some embodiments, the molar ratio of sulfamic acid to hydrogen peroxide used in contacting step (b) is from about 1:5 to about 1:1. In some embodiments, the molar ratio of sulfamic acid to hydrogen peroxide used in contacting step (b) is from about 1:3 to about 1:1.

Typically, both the amount of sulfamic acid and the amount of hydrogen peroxide contacted with or added to the sulfuric acid effluent are at least the stoichiometric amount. In some embodiments, both the amount of sulfamic acid and the amount of hydrogen peroxide contacted with or added to the sulfuric acid effluent are at least about twice the stoichiometric amount. In some embodiments, both the amount of sulfamic acid and the amount of hydrogen peroxide contacted with or added to the sulfuric acid effluent are at least about 3 times the stoichiometric amount.

The contacting step (b) of this disclosure can be carried out using well-known chemical engineering practices, which includes continuous, semi-continuous or batch operations. The first purifying agent and the second purifying agent can be mixed with the sulfuric acid effluent through agitation, stirring, turbulent flow, or other known methods. The first purifying agent and the second purifying agent can be stored at room temperature in storage tanks, separately or in combination as a mixture, and brought in contact with the sulfuric acid effluent in the contacting step (b). In some embodiments, the contacting step (b) can be carried out by adding the first purifying agent and the second purifying agent, separately or in combination as a mixture, into the sulfuric acid effluent. It will be appreciated that the process of this disclosure is advantageously run as a continuous process and can be easily adapted to a typical sulfuric acid production process.

In some embodiments of this invention, the second purifying agent is added to the sub-surface of the sulfuric acid effluent in the contacting step (b), wherein the temperature of the sulfuric acid effluent is greater than 100° C. In some embodiments of this invention, both the first purifying agent and the second purifying agent are added, separately or in combination as a mixture, to the sub-surface of the sulfuric acid effluent in the contacting step (b), wherein the temperature of the sulfuric acid effluent is greater than 100° C. In some embodiments, the temperature of the sulfuric acid effluent is from greater than 100° C. to about 150° C., from about 105° C. to about 150° C., from about 105° C. to about 140° C., from about 105° C. to about 130° C., from greater than 110° C. to about 150° C., from greater than 110° C. to about 140° C., from greater than 110° C. to about 130° C., or from about 110° C. to about 130° C. It was surprisingly found through experiments that such sub-surface addition is much more effective in removing niter than addition from above the surface of the sulfuric acid effluent under otherwise comparable conditions.

The first purifying agent may be contacted with the sulfuric acid effluent prior to, at the same time of, or after the contact of the second purifying agent with the sulfuric acid effluent. In some embodiments of this invention, the first purifying agent is added to the sulfuric acid effluent no later than the addition of the second purifying agent (to the sulfuric acid effluent). In some embodiments, the first purifying agent is added to the sulfuric acid effluent about 1, 2, 3, 4, 5, 6, 7, 8, 9, 10, 11, 12, 13, 14, or 15 minutes prior to the addition of the second purifying agent (to the sulfuric acid effluent). In some embodiments, the first purifying agent is added to the sulfuric acid effluent from about 1 minute to about 20 minutes prior to the addition of the second purifying agent (to the sulfuric acid effluent). In some embodiments, the first purifying agent is added to the sulfuric acid effluent from about 5 minutes to about 15 minutes prior to the addition of the second purifying agent (to the sulfuric acid effluent). In some embodiments, the first purifying agent is added to the sulfuric acid effluent at about the same time as the addition of the second purifying agent (to the sulfuric acid effluent). In some embodiments, the first purifying agent and the second purifying agent are mixed, and the resulting mixture is contacted with or added into the sulfuric acid effluent.

In this disclosure, the niter level is reduced by contacting the first and the second purifying agents with the sulfuric acid effluent to form a treated sulfuric acid effluent. The treated sulfuric acid effluent is maintained at a temperature (maintenance temperature) of greater than 100° C. for a maintenance period of at least about 1 minute. In some embodiments of this invention, the maintenance temperature is from greater than 100° C. to about 150° C., from about 105° C. to about 150° C., from about 105° C. to about 140° C., from about 105° C. to about 130° C., from greater than 110° C. to about 150° C., from greater than 110° C. to about 140° C., from greater than 110° C. to about 130° C., or from about 110° C. to about 130° C.

In this disclosure, the treated sulfuric acid effluent is not necessarily maintained at a constant temperature during the maintenance period. The temperature of the treated sulfuric acid effluent can change or fluctuate during the maintenance period as long as it is within the range of the maintenance temperature.

In some embodiments of this invention, the maintenance period is from about 1 minute to about 2 hours. In some embodiments, the maintenance period is from about 1 minute to about 1 hour. In some embodiments, the maintenance period is from about 5 minutes to about 30 minutes. In some embodiments, the maintenance period is from about 10 minutes to about 30 minutes.

The sulfuric acid effluent is typically, but not necessarily, collected in a treatment vessel such as, for example, a pump tank before being treated by the purifying agents or further processed. The treatment vessel can be integral with the absorption tower, or can be separate. In some embodiments, the sulfuric acid effluent is cooled prior to the contacting step (b). In some embodiments, the sulfuric acid effluent is cooled before being introduced into the treatment vessel. In some embodiments, the sulfuric acid effluent is passed through a heat exchanger in which heat is transferred from the sulfuric acid effluent to a heat transfer fluid before the sulfuric acid effluent is introduced into a treatment vessel.

In some embodiments, the treated sulfuric acid effluent is passed through a heat exchanger and is taken as product. In some embodiments, the sulfuric acid effluent, the first purifying agent, and the second purifying agent are introduced into a treatment vessel. After being maintained at the maintenance temperature for the maintenance period, the treated sulfuric acid effluent exits the treatment vessel, and at least a portion of the treated sulfuric acid effluent is recycled to the treatment vessel. The remaining portion of the treated sulfuric acid effluent can be taken as product.

In some embodiments, at least a portion of the treated sulfuric acid effluent is recycled as all or part of the sulfuric acid feed to the absorption tower. The remaining portion can be taken as product. The weight ratio of product to recycle can be any suitable ratio, for example a ratio in the range of 1% to 99%, and can, if desired, be zero or 100%.

At a point downstream of the treatment vessel (e.g., a pump tank), the temperature of the treated sulfuric acid effluent may decrease below the maintenance temperature. This can be caused by heat loss to the surroundings, but is usually a deliberate cooling step such as a heat exchanger.

In some embodiments of this invention, the time the treated sulfuric acid effluent is maintained at the maintenance temperature (the maintenance period) is determined by the rate (volume/minute) of sulfuric acid production and the hold-up volume of the production system between the point where the sulfuric acid effluent is treated and the point where the treated sulfuric acid effluent temperature decreases below the maintenance temperature. For some sulfuric acid plants, the average time between the absorption tower exit and cooling of the effluent below the maintenance temperature is in the range of from about 1 minute to about 10 minutes. If the sulfuric acid effluent is treated soon after exiting the tower, for example in the treatment vessel which can be a pump tank, the maintenance period of the treated sulfuric acid effluent is effectively the same range, which is to say from about 1 minute to about 10 minutes. The maintenance period can be anywhere from about 1 minute and up to, for example 2, 3, 4, 5, 6, 7, 8, 9, or 10 minutes.

In some embodiments, the sulfuric acid effluent or the treated sulfuric acid effluent can be diluted with water. In some embodiments, the diluting water is introduced into the sulfuric acid solutions through the aqueous sulfamic acid solution and/or the aqueous hydrogen peroxide solution. In some embodiments, the treated sulfuric acid effluent is diluted with water to the desired concentration as the product. The diluted treated sulfuric acid effluent can be cooled by means such as heat exchangers and directed to the storage tank.

In some embodiments, the water dilution can conveniently occur in a treatment vessel such as a pump tank. Likewise, the addition of the aqueous sulfamic acid and hydrogen peroxide solutions can conveniently occur in the same treatment vessel. The exothermic dilution of sulfuric acid with water also maintains or increases the temperature of the sulfuric acid effluent and in some embodiments no external heat source is needed to maintain the treated sulfuric acid effluent at the maintenance temperature during the maintenance period.

Sulfamic acid and hydrogen peroxide react with and consume niter thereby producing sulfuric acid product with significantly lower niter content than would have been produced by the same process without the addition of sulfamic acid and hydrogen peroxide. The rate of reaction at the effluent temperature of greater than about 100° C. can provide substantial niter reduction by the time the sulfuric acid product is recovered. The effluent temperature of greater than about 100° C. is routinely achieved in the normal course of sulfuric acid production. Thus, additional heating is unnecessary. However, additional heat can be provided if desired.

In some embodiments of this invention, after the maintenance period, the treated sulfuric acid effluent has a niter concentration of no more than about 5 ppm (as $NO_3$). In some embodiments, after the maintenance period, the treated sulfuric acid effluent has a niter concentration of no more than about 3 ppm (as $NO_3$). In some embodiments, after the maintenance period, the treated sulfuric acid effluent has a niter concentration of no more than about 1 ppm (as $NO_3$).

The present disclosure also provides a sulfuric acid solution produced by the process of this disclosure. Such sulfuric acid solution has sulfuric acid concentration in the range of about 90 wt % to about 99.5 wt % and has niter concentration (as $NO_3$) no more than about 5 ppm.

In some embodiments, the sulfuric acid solution produced by the process of this disclosure has sulfuric acid concentration in the range of about 93 wt % to about 99 wt %. In some embodiments, the sulfuric acid solution produced by the process of this disclosure has sulfuric acid concentration of about 93 wt % or about 99 wt %.

In some embodiments, the sulfuric acid solution produced by the process of this disclosure has niter concentration (as $NO_3$) no more than about 3 ppm or about 1 ppm.

Many aspects and embodiments have been described above and are merely exemplary and not limiting. After reading this specification, skilled artisans appreciate that other aspects and embodiments are possible without departing from the scope of the invention.

DESCRIPTION OF THE FIGURE

Figure 1:
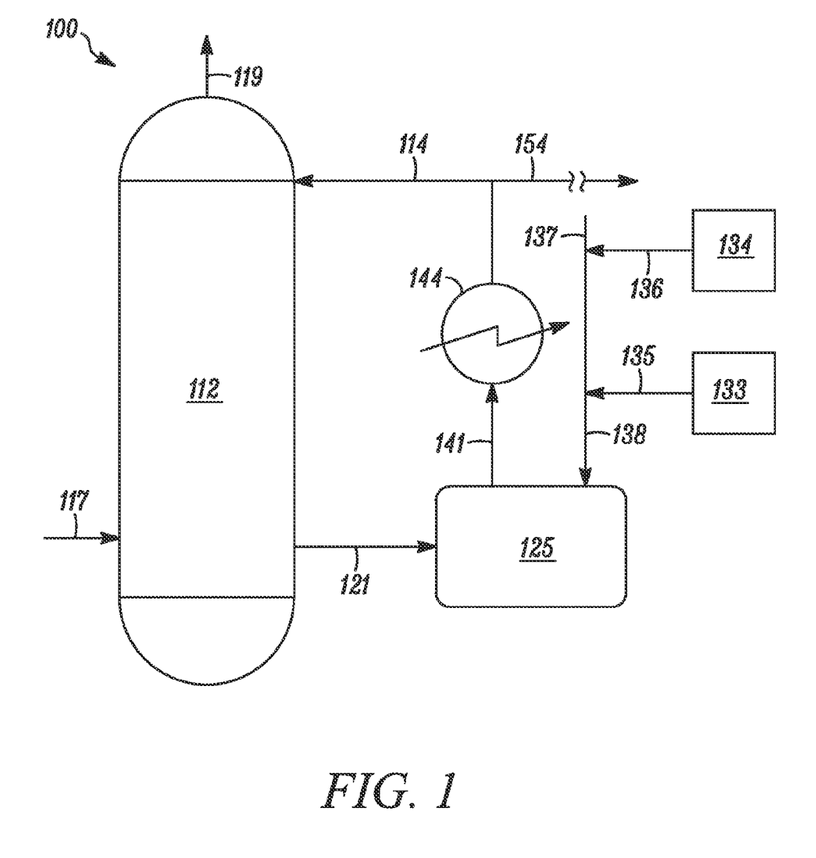
FIG. 1 illustrates an example of sulfuric acid production with integral sulfamic acid and hydrogen peroxide treatment.

FIG. 1 illustrates a sulfuric acid production unit 100 for one embodiment of the process of this disclosure. Certain detailed features of the present process, such as pumps, separation equipment, feed tanks, heat exchangers, product recovery vessels and other ancillary process equipment are not shown for the sake of simplicity and in order to demonstrate the main features of the process. Such ancillary features can be easily designed and used by one skilled in the art without any difficulty or undue experimentation.

As shown, an absorption tower 112 is fed with a sulfuric acid solution feed 114 having a first sulfuric acid concentration of about 98 wt % and a countercurrent flow of sulfur trioxide feed 117. Sulfur dioxide, which may come in with sulfur trioxide, is vented 119 from the top of the tower. The sulfuric acid effluent from the tower 121 having a second sulfuric acid solution concentration of about 99 wt % flows to a pump tank 125 wherein it is treated 138 with a metered amount 135 of an aqueous solution of sulfamic acid from storage tank 133 and a metered amount 136 of an aqueous solution of hydrogen peroxide from storage tank 134, and diluted with make-up water 137. The treated, diluted sulfuric acid effluent in the pump tank has a temperature greater than 100° C. and a residence time of at least about 1 minute. The process flow causes the contents of the pump tank to mix. The treated, diluted sulfuric acid effluent having a sulfuric acid concentration of about 98 wt % is pumped 141 to a heat exchanger 144 where it is cooled below about 95° C. after which the process stream is split into a product stream 154 and a recycle stream 114 which recycle stream is the sulfuric acid feed to the absorption tower.

Figure 2:
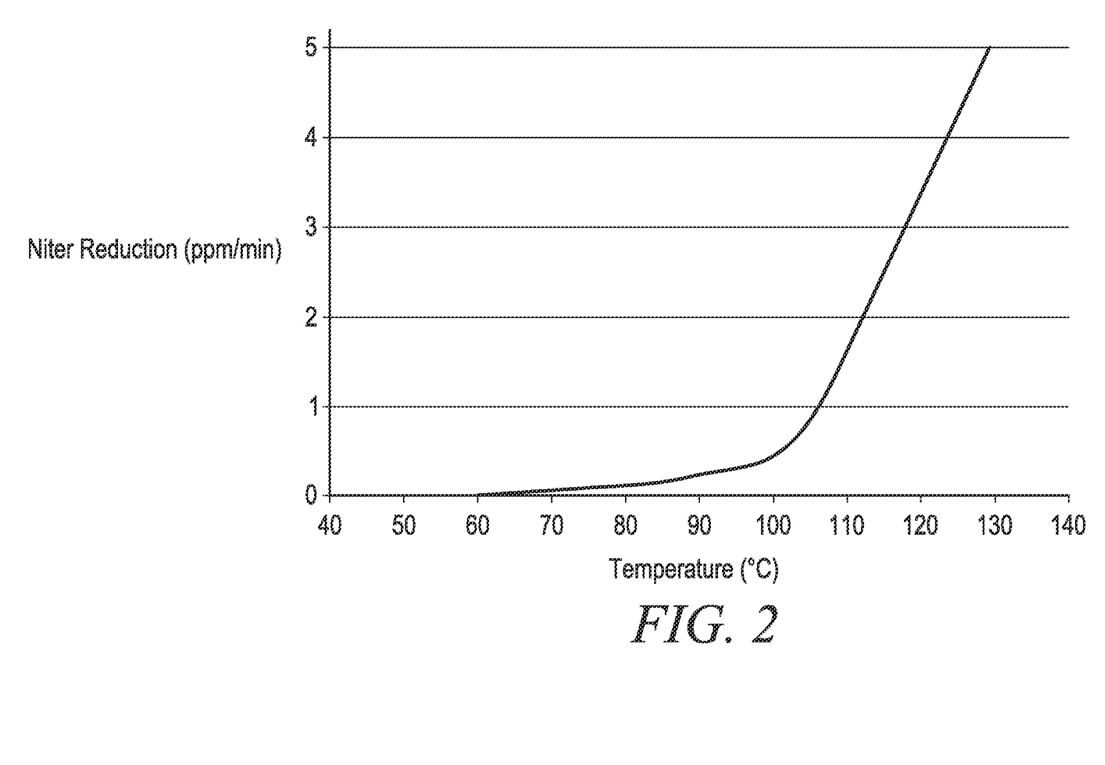
FIG. 2 illustrates the rate of the niter reduction vs temperature.

FIG. 2 illustrates the rate of the niter reduction vs temperature. Niter content is expressed as nitrate-equivalent concentration (ppm of $NO_3$).

Laboratory samples of 93 wt % sulfuric acid with 20 to 26.5 ppm niter content were treated with 1.5× to 3× the stoichiometric amount of sulfamic acid and hydrogen peroxide at 60° C., 90° C., 105° C. and 130° C. The reaction rate at 90° C. was found to be rather slow. However, at temperatures greater than 100° C., the rate of niter reduction was found to increase rapidly. It was realized that the sulfamic acid/hydrogen peroxide treatment could be used as an integral part of the sulfuric acid production where the sulfuric acid was typically greater than 100° C. for a long enough period, at least 1-10 minutes, that substantial reduction of niter can occur prior to recovering the sulfuric acid product.

FIG. 2 is a graph showing the rate of niter reduction (ppm/minute) in each sample as a function of temperature. As can be seen, the rate of niter reduction surprisingly increases exponentially as the treatment temperature is increased above 100° C.

EXAMPLES

The concepts described herein will be further described in the following examples, which do not limit the scope of the invention described in the claims.

Analytical Methods and Terms

Analysis for niter is based upon the reaction of ferrous sulfate with niter in concentrated sulfuric acid to produce a red color. The intensity of the color is proportional to the amount of niter present. In this disclosure, the intensity of the color is measured by using a UV/Vis spectrophotometer at 525 nm wavelength.

A standard ferrous sulfate solution is made by mixing 20 g $FeSO_4 7H_2O$, 75 mL deionized (DI) water and 9 g of reagent sulfuric acid (93 wt %).

A series of sodium nitrate calibration solutions were made by combining, in a 50 mL volumetric flask, known amounts of anhydrous sodium nitrate pre-diluted in 93 wt % reagent sulfuric acid, 1 mL of standard ferrous sulfate solution, and the balance to 50 mL of reagent sulfuric acid (93 wt %). The absorbance of the each calibration solution, spanning a range of concentrations, was measured in a 23 mm cell by using a UV/Vis spectrophotometer at 525 nm wavelength. Based on the collection of the absorbance data, a calibration curve of absorbance vs. concentration (expressed as ppm $NO_3$) was established for 93 wt % sulfuric acid samples.

A similar calibration curve for a sulfuric acid sample having a certain concentration (e.g., 99 wt %) can be established by using the same procedures as described above except that the reagent sulfuric acid of such certain concentration (e.g., 99 wt %) substitutes for the 93 wt % reagent sulfuric acid to make calibration solutions.

The niter level or concentration of a sulfuric acid sample was measured by adding 1 mL of the standard ferrous sulfate solution to about 49 mL of the sulfuric acid sample to make a 50 mL analytical solution. The absorbance of the analytical solution at 525 nm wavelength was measured by the UV/Vis spectrophotometer and was compared with the calibration curve to determine the niter concentration (expressed as ppm $NO_3$) of the sulfuric acid sample.

Example 1

A 1 wt % aqueous solution of sulfamic acid (SA) was prepared by dissolving 0.5 g of SA in DI (deionized) water. 1.6 g of such 1 wt % SA solution (room temperature, 2.9× the stoichiometric amount) was added to a 200 g 93 wt % $H_2SO_4$ sample containing 17.8 ppm niter (expressed as $NO_3$) at room temperature (RT). The mixture was stirred for 10 minutes before a 0.56 g 1 wt % $H_2O_2$ aqueous solution (RT, 2.9× the stoichiometric amount) was added in. The mixture was stirred for 1-2 more minutes and split into two samples. One sample was heated from RT to 110° C. for about 30 minutes, and the niter content was analyzed and found to be 0.9 ppm (as $NO_3$). The other sample was heated from RT to 110° C. for about one hour, and the niter content was analyzed and found to be 0.1 ppm (as $NO_3$).

Example 2

A 1 wt % aqueous solution of SA was prepared by dissolving 0.5 g of SA in DI water. 1.81 g of such 1 wt % SA solution (RT, 3× the stoichiometric amount) was added to a 200 g 99 wt % $H_2SO_4$ sample containing 17.9 ppm niter (expressed as $NO_3$) at RT. The mixture was stirred for 10 minutes before a 0.63 g 1 wt % $H_2O_2$ aqueous solution (RT, 3× the stoichiometric amount) was added in. The mixture was stirred for 1-2 more minutes and heated from RT to 110° C. for about 30 minutes. The niter content was analyzed and found to be 0.1 ppm (as $NO_3$).

Example 3 (Comparative)

A 1 wt % aqueous solution of SA was prepared by dissolving 0.5 g of SA in DI water. A 60 g 99 wt % $H_2SO_4$ sample containing 17.8 ppm niter (expressed as $NO_3$) was heated to 130° C. 0.51 g of the 1 wt % SA solution (RT, 3× the stoichiometric amount) and 0.18 g 1 wt % $H_2O_2$ aqueous solution (RT, 3× the stoichiometric amount) were added to the 130° C. $H_2SO_4$ sample simultaneously from above the surface of $H_2SO_4$. The mixture was stirred and kept at 130° C. One sample was taken five minutes after the addition. The analysis indicated it still contained 12.5 ppm niter (expressed as $NO_3$). Another sample was taken ten minutes after the addition. The analysis indicated it still contained 12.0 ppm niter (expressed as $NO_3$).

Example 4

A 1 wt % aqueous solution of SA was prepared by dissolving 0.5 g of SA in DI water. 0.76 g of such 1 wt % SA solution (21° C., 3× the stoichiometric amount) and 0.26 g of 1 wt % $H_2O_2$ aqueous solution (21° C., 3× the stoichiometric amount) were added simultaneously to a 60 g 93 wt % $H_2SO_4$ sample (at 21° C.) containing 26.5 ppm niter (expressed as $NO_3$). The mixture was stirred and heated to 130° C. The temperature rose from 21° C. to 130° C. in 11 minutes. After the mixture was kept at 130° C. for five minutes, a sample was taken for analysis. The niter content was found to be 1.5 ppm (as $NO_3$).

Example 5

A 1 wt % aqueous solution of SA was prepared by dissolving 0.5 g of SA in DI water. A 60 g 93 wt % $H_2SO_4$ sample containing 26.5 ppm niter (expressed as $NO_3$) was heated to 115° C. 0.38 g of the 1 wt % SA solution (RT, 1.5× the stoichiometric amount) and 0.26 g of 1 wt % $H_2O_2$ aqueous solution (RT, 3× the stoichiometric amount) were added simultaneously to the sub-surface of the 115° C. $H_2SO_4$ sample. The mixture was stirred and heated to 130° C. The temperature rose from 115° C. to 130° C. in 5 minutes. After the mixture was kept at 130° C. for five minutes, a sample was taken for analysis. The niter content was found to be 6.3 ppm (as $NO_3$).

Another 60 g 93 wt % $H_2SO_4$ sample containing 26.8 ppm niter (expressed as $NO_3$) was heated to 115° C. 0.76 g of the 1 wt % SA solution (RT, 3× the stoichiometric amount) and 0.26 g of 1 wt % $H_2O_2$ aqueous solution (RT, 3× the stoichiometric amount) were added simultaneously to the sub-surface of the 115° C. $H_2SO_4$ sample. The mixture was stirred and heated to 130° C. The temperature rose from 115° C. to 130° C. in 5 minutes. After the mixture was kept at 130° C. for five minutes, a sample was taken for analysis. The niter content was found to be 0.7 ppm (as $NO_3$).

Example 6

A 1 wt % aqueous solution of SA was prepared by dissolving 0.5 g of SA in DI water. Four identical $H_2SO_4$ samples were provided. Each had 60 g 93 wt % $H_2SO_4$ containing 26.2 ppm niter (expressed as $NO_3$). 0.25 g of the 1 wt % SA solution (RT, 1× the stoichiometric amount) and 0.26 g of 1 wt $H_2O_2$ aqueous solution (RT, 3× the stoichiometric amount) were added simultaneously to the first $H_2SO_4$ sample at RT. 0.38 g of the 1 wt % SA solution (RT, 1.5× the stoichiometric amount) and 0.26 g of 1 wt % $H_2O_2$ aqueous solution (RT, 3× the stoichiometric amount) were added simultaneously to the second $H_2SO_4$ sample at RT. 0.5 g of the 1 wt % SA solution (RT, 2× the stoichiometric amount) and 0.26 g of 1 wt % $H_2O_2$ aqueous solution (RT, 3× the stoichiometric amount) were added simultaneously to the third $H_2SO_4$ sample at RT. 0.75 g of 1 wt % SA solution (RT, 3× the stoichiometric amount) and 0.26 g of 1 wt % $H_2O_2$ aqueous solution (RT, 3× the stoichiometric amount) were added simultaneously to the fourth $H_2SO_4$ sample at RT. All four sample mixtures were heated from RT to 100° C. in 10 minutes and were kept at about 105° C. for 30 minutes. The niter contents were analyzed and listed in Table 1 below.

TABLE 1

|  | 1 wt % SA (g) | 1% $H_2O_2$ (g) | Niter (ppm $NO_3$) |
|---|---|---|---|
| Sample 1 | 0.25 | 0.26 | 2.2 |
| Sample 2 | 0.38 | 0.26 | 0.9 |
| Sample 3 | 0.5 | 0.26 | 1.9 |
| Sample 4 | 0.75 | 0.26 | 0.6 |

Example 7

A 1 wt % aqueous solution of SA was prepared by dissolving 0.5 g of SA in DI water. A 60 g 99 wt % $H_2SO_4$ sample containing 18.5 ppm niter (expressed as $NO_3$) was heated to 110° C. 0.5 g of the 1 wt % SA solution (RT, 2.9× the stoichiometric amount) was added to the sub-surface of the 110° C. $H_2SO_4$ sample while stirring. The mixture was kept stirring at 110° C. for ten minutes. Then 0.18 g of 1 wt % $H_2O_2$ aqueous solution (RT, 2.9× the stoichiometric amount) was added to the sub-surface of the mixture at 110° C. while stirring. After the resulting mixture was kept at 110° C. for another 30 minutes, a sample was taken for analysis. The niter content was found to be 0.3 ppm (as $NO_3$).

In another experiment, the above process was repeated except (1) 0.45 g of the 1 wt % SA solution (2.2× the stoichiometric amount) and 0.16 g of 1 wt % $H_2O_2$ aqueous solution (2.2× the stoichiometric amount) were used; and (2) the $H_2SO_4$ sample contained 21.9 ppm niter (expressed as $NO_3$). After the treatment, the niter content was found to be 0.78 ppm (as $NO_3$).

In another experiment, the above process was repeated except (1) 0.62 g of the 1 wt % SA solution (3× the stoichiometric amount) and 0.72 g of 0.1 wt % $H_2O_2$ aqueous solution (1× the stoichiometric amount) were used; and (2) the $H_2SO_4$ sample contained 21.9 ppm niter (expressed as $NO_3$). After the treatment, the niter content was found to be 16.0 ppm (as $NO_3$).

Example 8

An aqueous solution of SA and $H_2O_2$ was prepared by mixing 0.412 g of 10 wt % SA, 1.00 g of 1.8 wt % $H_2O_2$ and 1.41 g of DI water at RT. A 60 g 99 wt % $H_2SO_4$ sample containing 21.9 ppm niter (expressed as $NO_3$) was heated to 110° C. 0.28 g of the SA/$H_2O_2$ aqueous solution (RT, 2× the stoichiometric amount for SA, 2.5× the stoichiometric amount for $H_2O_2$) prepared above was added to the sub-surface of the 110° C. $H_2SO_4$ sample while stirring. After the resulting mixture was kept at 110° C. for 30 minutes, a sample was taken for analysis. The niter content was found to be 0.4 ppm (as $NO_3$).

The above process was repeated with another $H_2SO_4$ sample, and the niter content was found to be 0.3 ppm (as $NO_3$).

Example 9

A mixture of SA and $H_2O_2$ was prepared by mixing 3.91 g of 10 wt % SA aqueous solution and 9.51 g of 1.8 wt %

$H_2O_2$ aqueous solution at RT and fed to an addition funnel. A 5700 g 99 wt % $H_2SO_4$ solution containing 17.0 ppm niter (expressed as $NO_3$) was weighed into a 5 L round bottom flask and heated to 110° C. The SA/$H_2O_2$ mixture (RT, 2.6× the stoichiometric amount for SA, 3.2× the stoichiometric amount for $H_2O_2$) was added from the addition funnel to the sub-surface of the 110° C. $H_2SO_4$ solution while stirring. After the resulting mixture was kept at 110° C. for 30 minutes, a sample was taken for analysis. The niter content was found to be 0.8-0.9 ppm (as $NO_3$).

Example 10 (Comparative)

To a 368 g 93 wt % $H_2SO_4$ solution containing 25.1 ppm niter (expressed as $NO_3$) was added 0.022 g SA (1.5× the stoichiometric amount) and 0.034 g 30 wt % $H_2O_2$ aqueous solution (2× the stoichiometric amount) at RT while stirring. The resulting mixture was stirred and heated from RT to 90° C. A first sample was taken for analysis after the mixture being kept at 90° C. for 1 hour. The niter content was found to be 11.1 ppm (as $NO_3$). A second sample was taken after 2 hours, and the niter content was found to be 9.6 ppm (as $NO_3$). A third sample was taken after 3 hours, and the niter content was found to be 6.9 ppm (as $NO_3$).

Note that not all of the activities described above in the general description or the examples are required, that a portion of a specific activity may not be required, and that one or more further activities may be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification is to be regarded in an illustrative rather than a restrictive sense, and all such modifications are intended to be included within the scope of invention.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

It is to be appreciated that certain features are, for clarity, described herein in the context of separate embodiments, may also be provided in combination in a single embodiment. Conversely, various features that are, for brevity, described in the context of a single embodiment, may also be provided separately or in any subcombination.

What is claimed is:

1. A process for producing sulfuric acid with reduced levels of niter, comprising:
    a) providing an absorption tower wherein sulfur trioxide is absorbed in a sulfuric acid feed having a first sulfuric acid solution to produce a sulfuric acid effluent having i) a second sulfuric acid solution which has a higher concentration than the first sulfuric acid solution, ii) a niter concentration greater than about 5 ppm (as $NO_3$), and iii) a temperature greater than 100° C.; and
    b) contacting a first purifying agent comprising sulfamic acid and a second purifying agent comprising hydrogen peroxide with the sulfuric acid effluent to form a treated sulfuric acid effluent, the treated sulfuric acid effluent being maintained at a temperature of greater than 100° C. for a maintenance period of at least about 1 minute;
    wherein the first purifying agent and the second purifying agent are added to the sub-surface of the sulfuric acid effluent.

2. The process of claim 1 wherein both the amount of sulfamic acid and the amount of hydrogen peroxide added to the sulfuric acid effluent are at least the stoichiometric amount.

3. The process of claim 1 wherein both the amount of sulfamic acid and the amount of hydrogen peroxide added to the sulfuric acid effluent are at least about twice the stoichiometric amount.

4. The process of claim 1 wherein the first purifying agent is added to the sulfuric acid effluent no later than the addition of the second purifying agent.

5. The process of claim 1 wherein the first purifying agent and the second purifying agent are mixed, and the resulting mixture is contacted with the sulfuric acid effluent.

6. The process of claim 1 wherein the first purifying agent and the second purifying agent are contacted with the sulfuric acid effluent with a temperature greater than 100° C.

7. The process of claim 1 wherein the treated sulfuric acid effluent is maintained at a temperature of from about 105° C. to about 150° C.

8. The process of claim 1 wherein the treated sulfuric acid effluent has a niter concentration of no more than about 5 ppm (as $NO_3$).

9. A process for producing sulfuric acid with reduced levels of niter, comprising:
    a) providing an absorption tower wherein sulfur trioxide is absorbed in a sulfuric acid feed having a first sulfuric acid solution to produce a sulfuric acid effluent having i) a second sulfuric acid solution which has a higher concentration than the first sulfuric acid solution, ii) a niter concentration greater than about 5 ppm (as $NO_3$), and iii) a temperature greater than 100° C.; and
    b) contacting a first purifying agent comprising sulfamic acid and a second purifying agent comprising hydrogen peroxide with the sulfuric acid effluent to form a treated sulfuric acid effluent, the treated sulfuric acid effluent being maintained at a temperature of greater than 100° C. for a maintenance period of at least about 1 minute;
    wherein the sulfuric acid effluent and the purifying agents are introduced into a treatment vessel, the treated sulfuric acid effluent exits the treatment vessel after the maintenance period, and at least a portion of the treated sulfuric acid effluent is recycled to the treatment vessel.

10. The process of claim 9 wherein both the amount of sulfamic acid and the amount of hydrogen peroxide added to the sulfuric acid effluent are at least the stoichiometric amount.

11. The process of claim 9 wherein the first purifying agent is added to the sulfuric acid effluent no later than the addition of the second purifying agent.

12. The process of claim 9 wherein the first purifying agent and the second purifying agent are mixed, and the resulting mixture is contacted with the sulfuric acid effluent.

13. The process of claim 9 wherein the treated sulfuric acid effluent is maintained at a temperature of from about 105° C. to about 150° C.

14. The process of claim 9 wherein the treated sulfuric acid effluent has a niter concentration of no more than about 5 ppm (as $NO_3$).

15. A process for producing sulfuric acid with reduced levels of niter, comprising:

a) providing an absorption tower wherein sulfur trioxide is absorbed in a sulfuric acid feed having a first sulfuric acid solution to produce a sulfuric acid effluent having i) a second sulfuric acid solution which has a higher concentration than the first sulfuric acid solution, ii) a niter concentration greater than about 5 ppm (as $NO_3$), and iii) a temperature greater than 100° C.; and b) contacting a first purifying agent comprising sulfamic acid and a second purifying agent comprising hydrogen peroxide with the sulfuric acid effluent to form a treated sulfuric acid effluent, the treated sulfuric acid effluent being maintained at a temperature of greater than 100° C. for a maintenance period of at least about 1 minute; wherein the first sulfuric acid solution has a concentration of at least about 93 wt %.

16. The process of claim 15 wherein both the amount of sulfamic acid and the amount of hydrogen peroxide added to the sulfuric acid effluent are at least the stoichiometric amount.

17. The process of claim 15 wherein the first purifying agent is added to the sulfuric acid effluent no later than the addition of the second purifying agent.

18. The process of claim 15 wherein the first purifying agent and the second purifying agent are mixed, and the resulting mixture is contacted with the sulfuric acid effluent.

19. The process of claim 15 wherein the treated sulfuric acid effluent is maintained at a temperature of from about 105° C. to about 150° C.

20. The process of claim 15 wherein the treated sulfuric acid effluent has a niter concentration of no more than about 5 ppm (as $NO_3$).

21. A process for producing sulfuric acid with reduced levels of niter, comprising:

a) providing an absorption tower wherein sulfur trioxide is absorbed in a sulfuric acid feed having a first sulfuric acid solution to produce a sulfuric acid effluent having i) a second sulfuric acid solution which has a higher concentration than the first sulfuric acid solution, ii) a niter concentration greater than about 5 ppm (as $NO_3$), and iii) a temperature greater than 100° C.; and b) contacting a first purifying agent comprising sulfamic acid and a second purifying agent comprising hydrogen peroxide with the sulfuric acid effluent to form a treated sulfuric acid effluent, the treated sulfuric acid effluent being maintained at a temperature of greater than 100° C. for a maintenance period of at least about 1 minute; wherein the second sulfuric acid solution has a concentration of at least about 98 wt %.

22. The process of claim 21 wherein both the amount of sulfamic acid and the amount of hydrogen peroxide added to the sulfuric acid effluent are at least the stoichiometric amount.

23. The process of claim 21 wherein the first purifying agent is added to the sulfuric acid effluent no later than the addition of the second purifying agent.

24. The process of claim 21 wherein the first purifying agent and the second purifying agent are mixed, and the resulting mixture is contacted with the sulfuric acid effluent.

25. The process of claim 21 wherein the treated sulfuric acid effluent is maintained at a temperature of from about 105° C. to about 150° C.

26. The process of claim 21 wherein the treated sulfuric acid effluent has a niter concentration of no more than about 5 ppm (as $NO_3$).

* * * * *